United States Patent [19]

Gelbman

[11] Patent Number: 4,603,031
[45] Date of Patent: Jul. 29, 1986

[54] OZONE GENERATOR

[76] Inventor: Howard A. Gelbman, 2620 NW. 60th Way, Sunrise, Fla. 33313

[21] Appl. No.: 737,863

[22] Filed: May 28, 1985

[51] Int. Cl.$^4$ .......................... B01J 19/08; B01J 19/12
[52] U.S. Cl. ........................... 422/186.18; 422/186.07
[58] Field of Search ...................... 422/186.18, 186.19, 422/186.07

[56] References Cited

U.S. PATENT DOCUMENTS

| | | | |
|---|---|---|---|
| 804,291 | 11/1905 | Wood | 422/186.18 |
| 832,768 | 10/1906 | Bridge | 422/186.18 X |
| 935,457 | 9/1909 | Bridge | 422/186.18 |
| 1,010,777 | 12/1911 | Legget | 422/186.18 |
| 1,066,484 | 7/1913 | Freet | 422/186.18 |
| 2,326,601 | 8/1943 | Arff | 422/186.18 X |
| 2,350,842 | 6/1944 | Tsuno | 422/186.18 X |
| 2,658,868 | 11/1953 | Collison | 422/186.18 X |
| 3,023,155 | 2/1962 | Castor | 422/186.18 |
| 3,565,776 | 2/1971 | Arff | 422/186.18 |
| 4,410,495 | 10/1983 | Bässler et al. | 422/186.18 |

Primary Examiner—Teddy S. Gron
Assistant Examiner—S. Wolffe
Attorney, Agent, or Firm—Melvin K. Silverman

[57] ABSTRACT

The ozone generator having in combination a first tubular electrode surrounded by a tubular dielectric which, in turn, is surrounded by a second tubular electrode. Entry of air to be ozonized occurs into a first end of the first tubular electrode and, through a pattern of perforations, is permitted to escape therefrom into an annular volume between the first tubular electrode and the tubular dielectric. The first tubular electrode is centrally, radially, sealed so as to form two chemically and electrically separate chambers. The second or output chamber of the first tubular electrode is provided with a pattern of perforations which permits re-entry of the air, which has been ozonized while exposed to a voltage across the annular volume between the outside of the first electrode and the dielectric, to the second or output part of the first tubular electric.

9 Claims, 3 Drawing Figures

OZONE GENERATOR

BACKGROUND OF THE INVENTION

1. Field of the Invention

This invention relates to an Ozone Generator of the type provided with a pair of annular cylindrical electrodes, one facing the other, the inner electrode covered with a dielectric, which electrodes are connected to an energy source.

2. Description of the Prior Art

Ozone Generators, also known as ozonizers, are presently being used in increasing numbers in industrial applications, principally because ozone is used as a strong oxidation medium for air quality improvement, drinking water treatment, food storage, waste water purification, as well as further application in the areas of chemistry, medicine, and public health.

Methods and devices for carrying out electrical discharge reactions have been long known in the art, and the most relevant structures of ozone generators, relative to the Applicant's herein set forth invention, are shown in U.S. Pat. No. 804,291 (1905) to Wood; U.S. Pat. No. 935,457 (1909) to Bridge; U.S. Pat. No. 1,010,777 (1911) to Leggett; U.S. Pat. No. 2,326,601 (1943) to Arff; U.S. Pat. No. 2,658,868 (1953) to Collison; U.S. Pat. No. 3,565,776 (1971) to Arff; and U.S. Pat. No. 4,410,495 (1985) to Bassler.

The area of classification of the pertinent art of record is believed to be U.S. Class 422, Subclass 186.18.

A problem in the prior art has been the provision of an ozone generator having a uniform volume and density of ozone as its output. Also, adequacy of fluid pressure at the output of the ozone generator has frequently presented a problem. It is to these problem areas in the prior art that the present invention is directed.

SUMMARY OF THE INVENTION

The present invention comprises an ozone generator having in combination a first tubular electrode surrounded by a tubular dielectric which, in turn, is surrounded by a second tubular electrode. Entry of air to be ozonized occurs into a first end of the first tubular electrode and, through a pattern of perforations, is permitted to escape therefrom into an annular volume between the first tubular electrode and the tubular dielectric. The first tubular electrode is centrally, radially, sealed so as to form two chemically and electrically separate chambers. The aforementioned entry or input into the first tubular electrode is to the first chamber and is electrically insulated from the second chamber of the first tubular electrode. The second or output chamber of the first tubular electrode is provided with a pattern of perforations which permits re-entry of the air, which has been ozonized while exposed to a voltage across said annular volume, to the second or output part of the first tubular electrode. The above geometry provides improved pressure, flow rate and uniformity of ozone density from the output of the generator.

It is an object of the present invention to provide a practical, efficient, and reliable apparatus for the production of ozone in uniform pressures and concentrations.

It is another object of the present invention to provide a structure of the above-referenced type suitable for ready connection in both parallel and series, to thereby increase the parameters of fluid flow or density of the output.

A further object is to provide a means for a more efficient production of ozone than has been heretofore available in the art.

It is a further object to provide an ozone generator, the output of which will be free of pulsations of compressed ozone, this being a common problem in the prior art.

The above and yet further objects and advantages of the present invention will become apparent from the hereinafter set forth Detailed Description of the Invention, the Drawings, and Claims appended herewith.

DETAILED DESCRIPTION OF THE INVENTION

Figure 1:
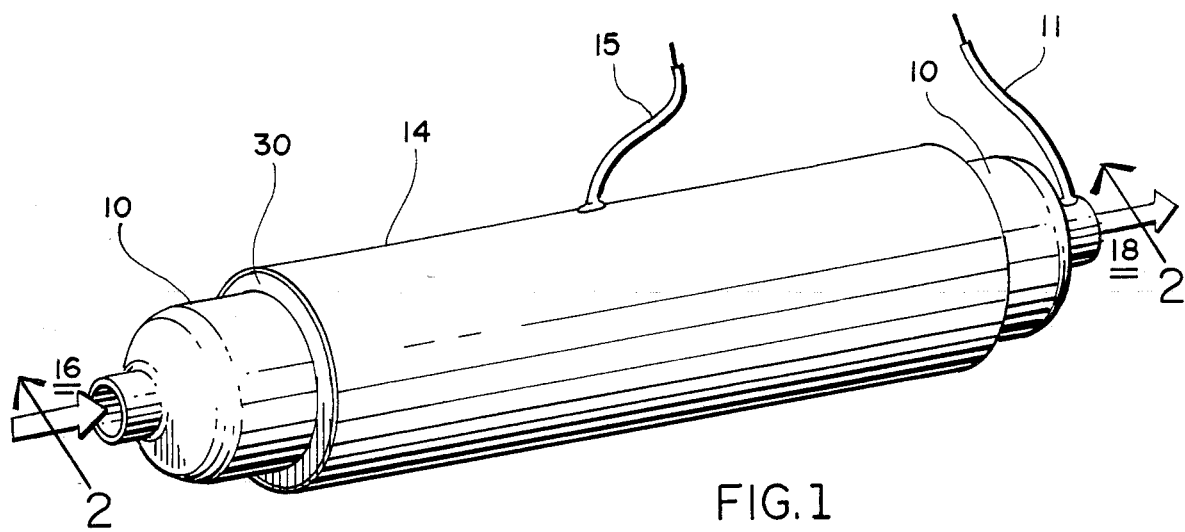
FIG. 1 is a perspective view of the present ozone generator.
Figure 2:
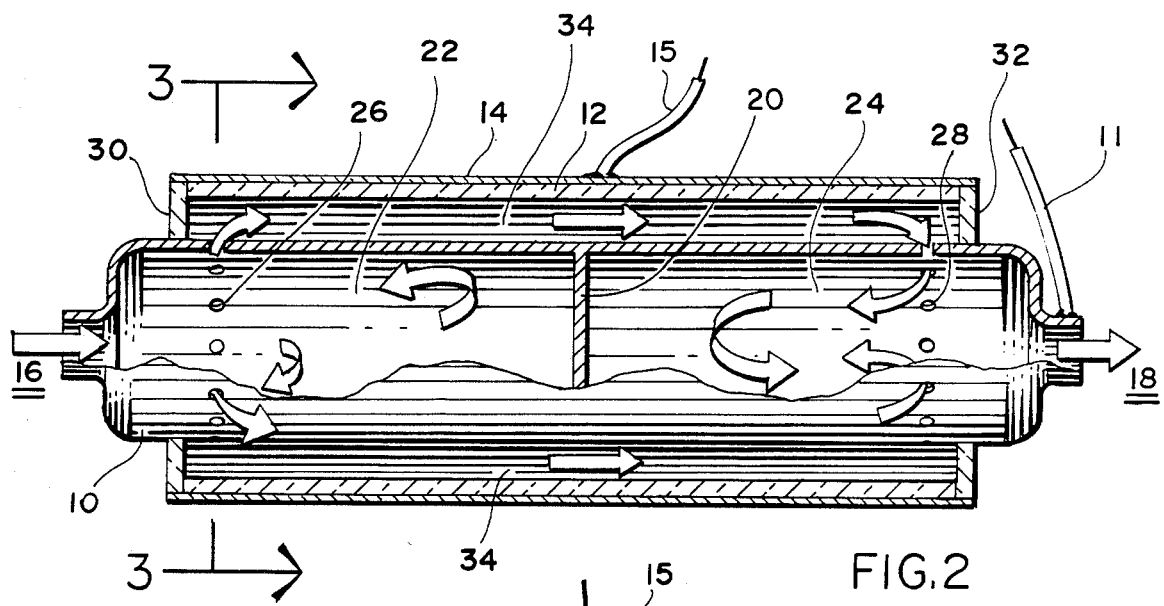
FIG. 2 is a longitudinal cross-sectional view taken along Line 2—2 of FIG. 1.
Figure 3:
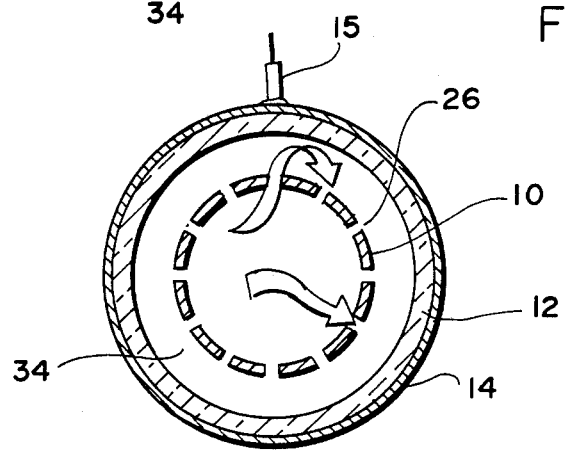
FIG. 3 is a radial cross-sectional view taken along Line 3—3 of FIG. 2.

Shown in FIGS. 1, 2 and 3 is a first cylindrical electrode 10 which, in a preferred embodiment, comprises a stainless steel cylinder. The first electrode 10 is surrounded by a cylindrical dielectric 12 which, in a preferred embodiment, comprises a pyrex glass tube. Said dielectric 12 is surrounded by a second cylindrical electrode 14 which, in a preferred embodiment comprises a copper sleeve.

Further shown, in FIG. 1, is a wire connection 11 for first electrode 10 and a wire connection 15 for second electrode 14. These wire connections 11 and 15 are connected to a suitable electric power supply.

FIG. 1 further shows an input 16 and an output 18 of the present generator.

The structure and operation of the ozone generator is more fully illustrated with reference to the longitudinal view of FIG. 2. Therein is shown wall 20 centrally disposed within first electrode 10. This wall operates to electrically and chemically divide the first electrode into a first compartment 22 and a second compartment 24. The first electrode 10 is further provided with a first set of perforations 26 within the wall of said first compartment 22 and is provided with a second series of perforations 28 within the wall of the second compartment 24 of first electrode 10.

The dielectric 12 is provided with a first radial seal 30 which assures a fluid tight relationship between the dielectric and the outer wall of the first electrode 10. Dielectric 12 is further provided with a second radial seal 32 which assures a fluid tight seal between the dielectric and the outer wall of the first electrode 10 at the output side of the ozone generator.

With reference to the large arrows of FIGS. 2 and 3, the passage of air from input 16 to output 18 can be traced. More particularly, after suitable power has been applied across wire leads 11 and 15, air is inputted at 16 and enters compartment 22 of the first electrode. Therein, pressurization of the air occurs until a steady uniform flow of air is able to escape through perforations 26. Therefrom, air enters an annular volume 34 existing between the outside of first electrode 10 and the inside of dielectric 12. As may be noted in FIG. 2, the compressed air travels the entire longitudinal length of the structure in the direction of the output side thereof.

During the period of passage from the input side across annular volume 34 and to the output side of the ozone generator, the air is constantly exposed to the corona effect of high voltages in the range of 15,000 voltages at 10 to 20 millamps, such that, by the time the air has re-entered first electrode 10 through perforations 28, it has acquired the additional oxygen molecule to become an ozone of high purity. The radial width of volume 34 is preferably in the range of 1.0 to 2.0 millimeters.

Within output compartment 24 of electrode 10, sufficient pressure is permitted to build-up therein before removal of the ozone is commenced through output 18.

As noted in FIG. 2, perforations 26 and 28 are disposed near the seals 30 and 32 respectively. These perforations are typically provided with a diameter in the range of 1.0 to 2.0 millimeters. Further, a preferred radial width of annulus 34 is between 1.0 and 2.0 millimeters. It has been established that function of the extended annulus 34 is to eliminate, in the flow of fluid therethrough, pulsations which generally derive from the input 16 which, itself, represents the output of an air compressor. The output of air compressors has been found to contain pulsations which degrade the uniformity and other characteristics of the output 18 of the generator.

It is to be further appreciated that the structure shown in the figures and described above may be connected in series where one wishes to increase the concentration or density of ozone provided to a given application. In addition, where a greater volume of ozone is required, the present inventive structure may be connected in parallel with like structures.

In a preferred embodiment, the preferred length of the first electrode is approximately 240 millimeters while the outer radius of the first electrode is approximately 10 millimeters.

Further, the preferred length of the dielectric is approximately 165 millimeters, while its outer radius is 16 millimeters. The ratio of lenth to width of the entire structure is about 15:1.

While there is shown and described the preferred embodiment of the present invention, it is to be understood that the invention may be embodied otherwise than is herein illustrated and described, and that in the above embodiment, certain changes in the detail of construction, and in the form and arrangement of the parts, may be made without departing from the underlying idea or principles of this invention in the scope of the appended claims.

Having thus described my invention, what I claim as new, useful and non-obvious and, accordingly, secured by Letters Patent of the United States is:

1. An ozone generator, comprising:
    (a) an elongate cylindrical first electrode having a first end, a middle, and a second end, the first end comprising a narrow opening into which air to be ozonized is pumped, said middle comprising a radial seal separating said first electrode into a first and second chamber, said second end comprising a narrow opening out of which ozonized air is drawn, said first chamber having fluid communication with said first end, and said second chamber having fluid, communication with said second end, said first chamber having a plurality of perforations in the wall of said first electrode, said perforations disposed near said first end thereof, said second chamber having a plurality of perforations in the wall of said first electrode disposed near said second end of said first electrode;
    (b) a cylindrical dielectric proportioned to extend along the length of said first electrode and at least sufficiently to cover said first and second pluralities of perforations, the geometry of said dielectric thereby defining an annulus between the outside of said first electrode and the inside of said cylindrical dielectric;
    (c) annular sealing means for forming a fluid-tight seal at both ends of said annulus;
    (d) a elongate cylindrical second electrode adhered to and disposed about substantially the entire lateral surface of said dielectric; and
    (e) power means electrically connected to said first and second electrodes for the selective application of electrical potential therebetween,
    whereby air pumped into the first end of said first electrode is partially pressurized within said first chamber, forced-out through said first plurality of perforations into said annulus, then exposed to a high voltage while moving through said annulus toward said second end of said first electrode, forced into the second chamber of said first electrode through said second plurality of perforations, then partially pressurized therein, and drawn out of the second end of said first electrode, the air thereby having been at least partially ionized by virtue of the corona-effect electric discharge occuring within said annulus.

2. The ozone generator as recited in claim 1 in which said first cylindrical electrode comprises a stainless steel cylinder.

3. The ozone generator as recited in claim 1 in which said dielectric comprises a pyrex glass tube.

4. The ozone generator as recited in claim 1 in which said second cylindrical electrode comprises a copper sleeve.

5. The ozone generator as recited in claim 1 in which said first cylindrical electrode comprises a stainless steel cylinder, in which said dielectric comprises a pyrex glass tube; and in which said second cylindrical electrode comprises a copper sleeve.

6. The ozone generator as recited in claim 1 in which said electrical power means comprises a voltage potential in the range of 15,000 volts.

7. The ozone generator as recited in claim 1 in which the ratio of the longitudinal length of said first electrode to the radial cross-section of the entire ozone generator is about 15:1.

8. The ozone generator as recited in claim 7 in which the diameter of each perforation of said first and second plurality of perforations is in the range of 1.0 to 2.0 millimeters.

9. The ozone generator as recited in claim 8 in which the radial width of the annulus existing between the outside of said first electrode and the inside of said dielectric is in the range of 1.0 to 2.0 millimeters.

* * * * *